July 11, 1944.  H. H. BARBER  2,353,538
APPARATUS FOR CONTROLLING GASEOUS ATMOSPHERE
Filed April 23, 1940  3 Sheets-Sheet 1
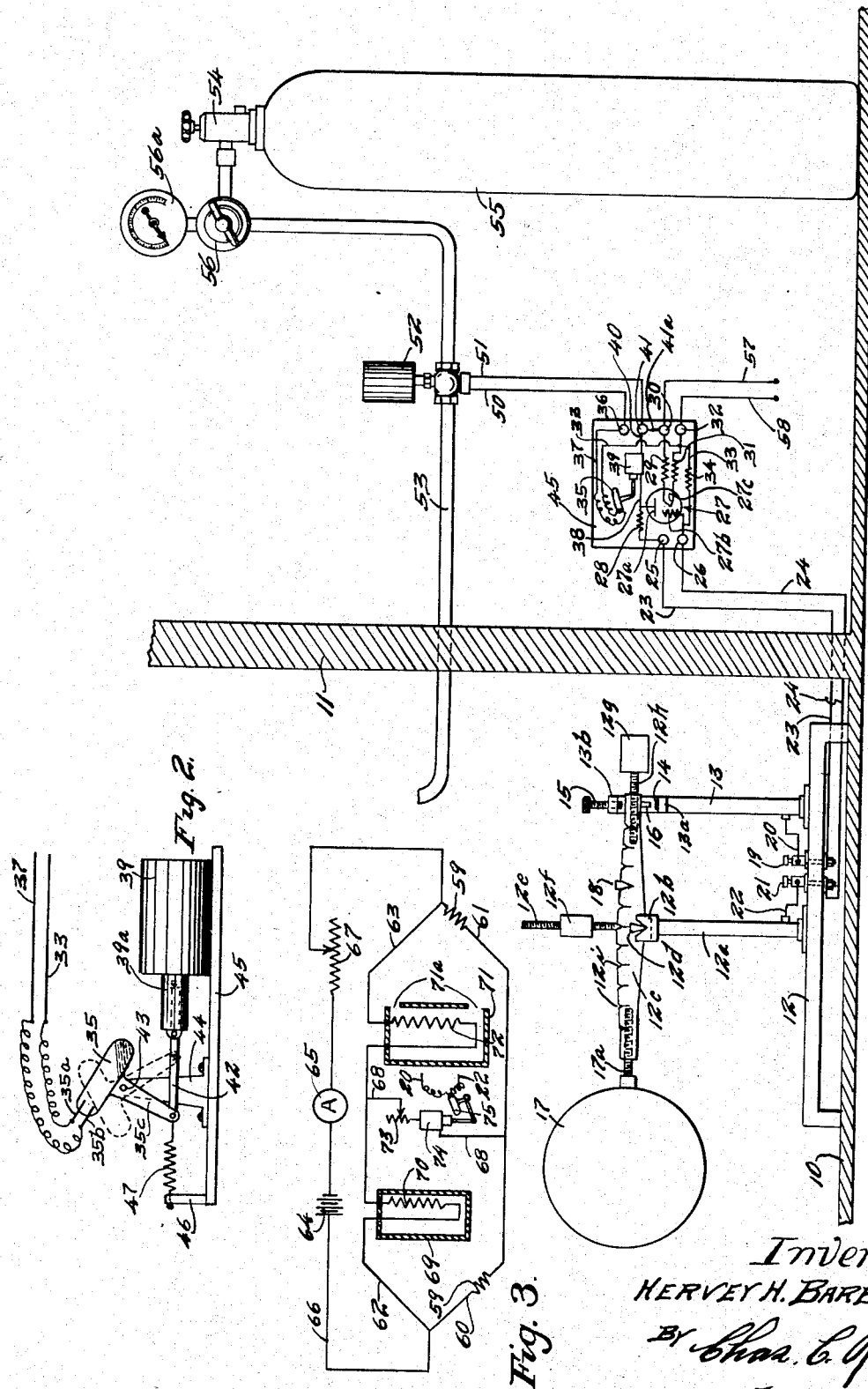
Inventor
HERVEY H. BARBER
By Chas. C. Rey
Attorney

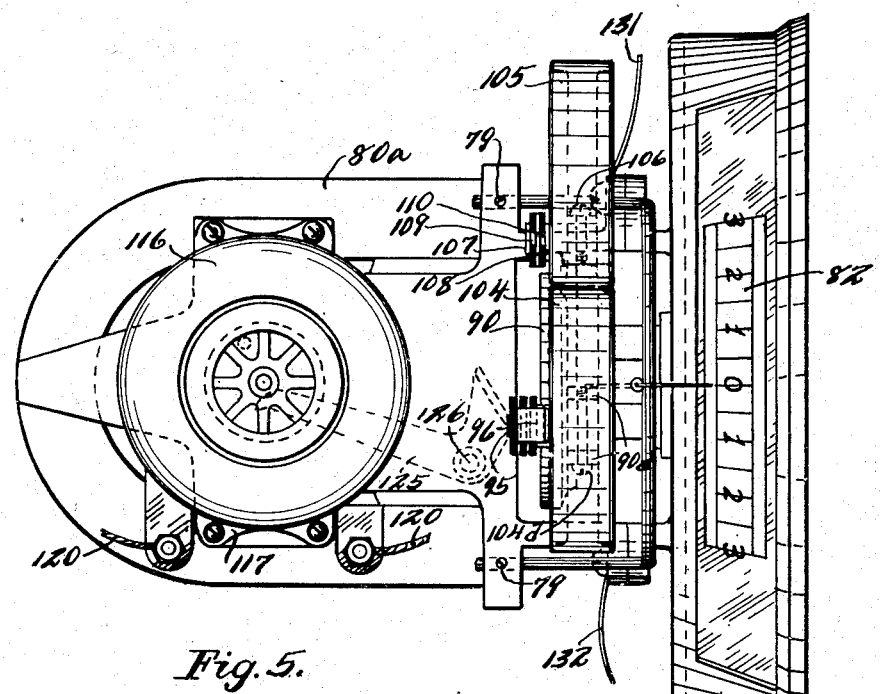

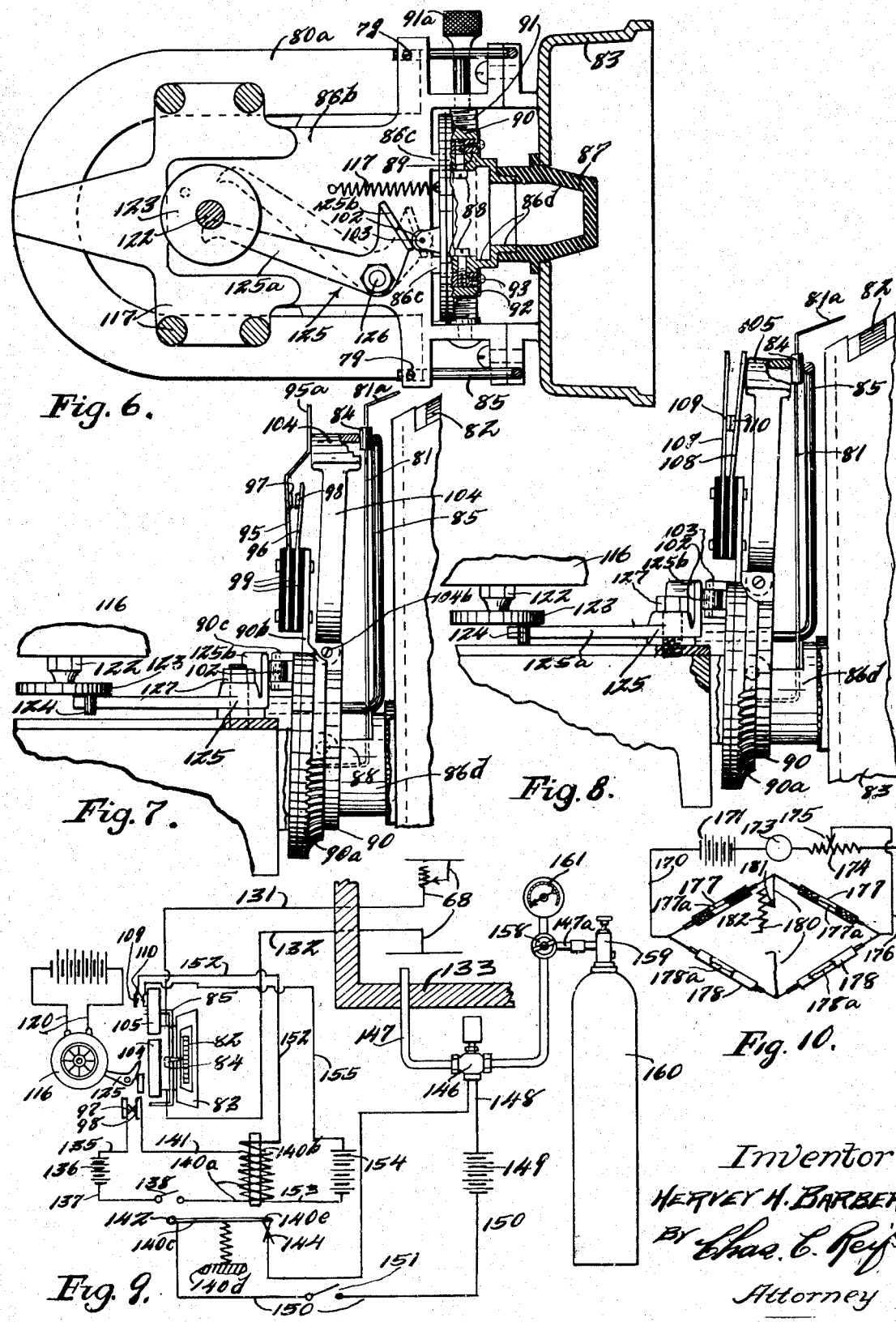

Patented July 11, 1944

2,353,538

UNITED STATES PATENT OFFICE 2,353,538

APPARATUS FOR CONTROLLING GASEOUS ATMOSPHERE

Hervey H. Barber, St. Paul, Minn.

Application April 22, 1940, Serial No. 331,261

3 Claims. (Cl. 99—271)

This invention relates to a method and apparatus for the preservation of articles of food and particularly to a method and apparatus of regulating and maintaining an atmosphere containing a definite proportion of carbon dioxide gas in a storage chamber for articles of food.

It has been discovered that atmospheres having certain proportions of carbon dioxide gas have remarkable qualities for the preservation of articles of food. Meat can be preserved in good condition in an atmosphere of air and carbon dioxide containing from 12 to 20 percent of the latter. The results obtained are even better than obtained by careful refrigeration. Vegetables can likewise be preserved with an atmosphere of from 2 to 6 percent of carbon dioxide, while fruits may be preserved in an atmosphere of from 3 to 10 percent. Cut flowers can also be preserved in a remarkable manner in an atmosphere of carbon dioxide and roses in particular can be kept for quite a long period with the petals still in firm and attached condition. Fish can be preserved without losing the flavor of fresh fish. One objection to preserving fish in cold storage is that the flavor is largely lost.

While it is fairly easy to secure an atmosphere of carbon dioxide, heretofore no successful or practical means has been produced for controlling such an atmosphere and maintaining the atmosphere with the desired percentage of carbon dioxide.

It is an object of this invention to provide a method and apparatus by means of which an atmosphere containing air and a definite proportion of carbon dioxide may be maintained in uniform condition.

It is another object of the invention to provide a storage chamber for articles of food having therein an atmosphere of air with a definite proportion of carbon dioxide and means for maintaining said atmosphere with such proportion actuated by the difference in properties of carbon dioxide and air or other gas lighter than carbon dioxide.

It is still another object of the invention to provide a method and apparatus for regulating and maintaining an atmosphere containing a definite proportion of carbon dioxide in a storage chamber for articles of food comprising the use of a source of carbon dioxide gas, means connecting said source of gas with said chamber, electrically operated means for operating said last mentioned means and means disposed in said chamber and actuated by the difference in properties of carbon dioxide and air for controlling said last mentioned means.

These and other objects and advantages of the invention will be fully set forth in the following description made in connection with the accompanying drawings in which like reference characters refer to similar parts throughout the several views and in which—

Fig. 1 is a somewhat diagrammatic view of one form of apparatus used;

Fig. 2 is a view on an enlarged scale showing a portion of the apparatus illustrated in Fig. 1;

Fig. 3 is a diagrammatic view of another form of apparatus which might be used;

Fig. 4 is a view in side elevation of a modified form of apparatus, some parts being broken away and others shown in vertical section;

Fig. 5 is a plan view of the device shown in Fig. 4;

Fig. 6 is a horizontal section taken substantially on line 3—3 of Fig. 4 as indicated by the arrows;

Fig. 7 is a partial view similar to Fig. 4 showing the parts in different positions;

Fig. 8 is a view similar to Fig. 4 showing the parts in different positions;

Fig. 9 is a wiring diagram; and

Fig. 10 is a diagrammatic view of a slightly different form of bridge used.

Referring to the drawings, particularly Figs. 1 to 3, a portion of a chamber is shown comprising a floor 10 and one vertical side wall 11 thereof, which chamber will contain an atmosphere of air and carbon dioxide with a definite proportion of the latter. Said chamber will be used for the storage of articles of food or other articles to be preserved, such as meat, vegetables, fruits, milk products and flowers, etc. In the embodiment of the invention illustrated in Figs. 1 and 2, a balance is provided comprising a base 12 having a central vertically extending standard 12a with a bearing 12b at its top having a V-shaped recess therein. A balance beam 12c is provided with members 12d having edged blades secured thereto, the edges of which seat in the recess in member 12b. A screw 12e extends centrally from the beam 12c and has adjustable thereon a weight 12f for varying the sensitivity of the balance and decreasing the pendulum action. A standard 13 extends vertically adjacent one end of the base 12, the same having forwardly extending projections 13a and 13b between which one end of balance beam 12c is disposed. An electrical contact 14 is carried on the upper side of member 13a and a thumb screw 15 extends through portion 13b being adjustable therein, the lower end of which forms a stop for beam 12c. Beam 12c carries adjacent its end and at the lower side thereof an electrical contact member 16 adapted to engage with contact member 14. A weight 12g has a screw 12h secured thereto which is threaded into and adjustable in one end of beam 12c so that said weight may be used to balance said beam. A container 17 shown as of spherical form is provided and this preferably will be made of thin material such as glass or metal. Container 17 also has secured thereto a screw 17a threaded into one end of beam 12c and adjustable therein for the purpose of balancing beam 12c. Beam 12c is provided with a plurality of notches 12i and said beam may be graduated in connection with said notches to indicate percentages of carbon dioxide in the atmosphere. An indicating member 18 is movable on beam 12c and may be disposed in any one of the notches 12i. A binding post 19 is secured in base 12, which base preferably is of non-conducting material and said binding post is connected by an electrical conductor 20 to the standard 13 which preferably is of metal so that binding post 19 is connected to contact 14. Another binding post 21 is secured in base 12 and connected by an electrical conductor 22 to standard 12a which is also preferably of metal as is beam 12c. Binding post 21 is thus connected to the contact member 16. Electrical conductors 23 and 24 extend from binding posts 19 and 21 to the outer side of the chamber within wall 11 and are respectively connected to binding posts or contacts 25 and 26 forming the grid contacts of a vacuum tube 27, such as now commonly used in radio receiving sets. Said tube is shown as having a plate 27a connected through a resistance 28 to contact member 25. While the value of resistance 28 might vary, in one embodiment of the invention in practice a resistance of one-fifth of a megohm has been used. Tube 27 has a grid 27b therein which is connected to contact member 26. Tube 27 also has a filament 27c, one end of which is connected through a resistance 29 to a contact member or binding post 30. While resistance 29 might be varied, in one embodiment of the invention in practice a resistance of 350 megohms has been used. The other end of filament 27c is connected through a resistance 31 to a contact or binding post 32. While resistance 31 might be varied, in practice a resistance of 100 megohms has been used successfully. A conductor 33 is connected to grid 27b and conductor 31 and extends through a resistance 34 and to one contact 35a of a mercury tube switch 35. Another contact member 36 of tube 27 is connected by a conductor 37 to the other contact 35b of switch 35. The plate 27a is connected by a conductor 38 to one end of the winding of a small solenoid 39, the other end of said winding being connected by a conductor 40 to a contact or binding post 41 forming part of the plate circuit of tube 27. A conductor 41a connects binding posts 30 and 41. Solenoid 39 has a plunger core 39a connected by a link 42 to an arm 35c of switch 35, said arm being oscillatable about a pivot member 43 carried in a bracket 44 secured to a base member 45 on which solenoid 39 is mounted. An upright post or bracket 46 is secured at one end of base 45 and connected by a tensile spring 47 to the end of link 42 so that plunger 39a will be retracted when solenoid 39 is deenergized. A pair of conductors 50 and 51 extend respectively from contacts 36 and 41 and are connected to the contacts of a solenoid valve 52. Solenoid valve 52 is disposed in or has secured thereto the communicating portions of a conduit 53 which extends through wall 11 and has an open end delivering into the chamber within wall 11. The other end of conduit 53 extends to an outlet valve 54 secured to the top of a metal cylinder 55 containing carbon dioxide under pressure. Cylinder 55 is of the usual commercial form in which carbon dioxide under great pressure is carried. A reducing valve 56 is disposed in the conduit 53, the same being shown as having thereon a gauge 56a. A pair of conductors 57 and 58 are connected respectively to the contacts 30 and 32 which are connected to the filament 27c. 110 volt alternating current will be supplied to conductors 57 and 58 from any suitable source of supply as from an ordinary electrical socket.

In the method of regulating and maintaining the atmosphere in the chamber within wall 11 the balance carried on base 12 will be set so that it will be balanced with the desired percentage of carbon dioxide in the atmosphere. The valve 54 remains open and the carbon dioxide from cylinder 55 passes through conduit 53, through the reducing valve 56 to valve 52. When current is supplied through conductors 50 and 51 valve 52 is open and when no current is passing said valve is in closed position. Assuming that the atmosphere in the chamber within wall 11 has not yet reached the desired content of carbon dioxide the apparatus will be in the position indicated in Fig. 1. Container 17 will not be lifted to close contacts 14 and 16. The plate circuit of tube 27 will be closed and current will be supplied to solenoid 39. Resistance 34 in the conductor 33 connected to grid 27b with contacts 25 and 26 not connected prevents flow of the current through the grid. Current thus flows from line 58 to contact 32 and filament 27c thence to plate 27a and through conductor 38 and solenoid 39 to contact 41, thence through conductor 41a to contact 30 and line 57. Thus solenoid 39 will be energized and mercury switch 35 will be tilted to closed position. A circuit is then closed through contacts 50 and 51 controlled by switch 35 and solenoid valve 52 is opened. Carbon dioxide may now flow into the chamber within wall 11. When the desired content of carbon dioxide is attained in the atmosphere, container 17, which contains air or a gas much lighter than carbon dioxide, will be raised, lowering the other end of beam 12c and engaging contacts 14 and 16. This will connect conductors 23 and 24 and thus contacts 25 and 26. With contacts 25 and 26 thus connected a bias is put on grid 27b and the current now will flow from filament 27c to the grid 27b and the flow of current to the plate 27a will be discontinued. Resistance 28 is a two million ohm resistance and there is not enough current flowing therethrough or through the above mentioned circuit to operate solenoid 39. Solenoid 59 will be deenergized and spring 47 will swing switch 35 to open position. The circuit through conductors 50 and 51 is now opened and valve 52 is closed. The supply of carbon dioxide to the chamber is now cut off and the atmosphere in said chamber now contains the desired percentage of carbon dioxide. Should some of the carbon dioxide leak out or should the percentage of carbon dioxide in the atmosphere decrease, container 17 will move downward, separating contacts 14 and 16. This will open the connection between conductors 23 and 24 and contacts 25 and 26, and current will again flow from line 58 to filament 27c, from filament 27c to and through plate 27a and through solenoid 29 thus actuating solenoid 39, thus moving switch 35 to closed position and again actuating valve 52 to open the same and permit carbon dioxide to flow into the chamber. The amount of current flowing in the grid circuit of tube 27 which includes contacts 14 and 16 is very small so that there is no appreciable sparking at contacts 14 and 16. With the described method and apparatus for regulating and maintaining the desired percentage of carbon dioxide in the atmosphere the said percentage can be regulated within very small limits. The regulation is very accurate and as above stated the atmosphere can be regulated within very small limits.

In the method and apparatus above described the regulation of the atmosphere is secured by actuating a member in the chamber by the difference in density between carbon dioxide and air or some lighter gas. In the modification shown in Fig. 3 an apparatus is indicated which may be actuated by the difference in thermal conductivity between carbon dioxide and air or some lighter gas. In Fig. 3 an electrical apparatus comprising the well known Wheatstone bridge is shown. This comprises the conductors 60 and 61 at one side of the bridge and conductors 62 and 63 at the other side of the bridge. In the usual construction of such a bridge fixed resistances 59 are disposed in three of said conductors, such as 60, 61 and 62 and a variable resistance is disposed in the other conductor. Current is supplied to the opposite ends of the bridge at the junction of conductors 60 and 62 and the junction of conductors 61 and 63. This is supplied from a battery 64 or other suitable source of current. An ammeter 65 is shown in conductor 66 which supplies current to the bridge and an adjustable resistance 67 is also shown in said conductor. A conductor 68 extends across the central part of said bridge and a tube 69 is disposed in the conductor or leg 62. The tube 69 will contain air or some lighter gas and may be sealed. A resistance 70 formed of very fine wire will be disposed in tube 69 and in conductor 62 which extends into said tube. Another tube 71 is disposed in the conductor or leg 63 and a resistance 72 formed of fine wire will be disposed in tube 71 and in conductor 63 which extends into said tube. Tube 72 will be open as indicated by the openings 71a so that the atmosphere in the chamber within wall 11 may circulate freely therein. An adjustable resistance 73 is disposed in conductor 68 as is also the winding of a small solenoid 74 which will operate a small mercury tube switch 75. With the described arrangement and the apparatus disposed in the chamber within wall 11 the same will operate as follows:

Resistance 73 will be adjusted so that the bridge will be balanced when or up to the point when the desired percentage of carbon dioxide is attained in the atmosphere. No current will then flow through conductor 68 or solenoid 74 and switch 75 will be maintained in open position. Should the percentage of carbon dioxide now increase there will be a difference in the gas entering tube 71 and this will have a different thermal conductivity. In other words, there is now enough carbon dioxide present so that heat will be conducted away from member 72 varying its resistance enough to unbalance the Wheatstone bridge. The resistance of wire 70 in tube 69 will not be affected by the atmosphere in the chamber since tube 69 is closed. The resistance of member 72 will be varied unbalancing the bridge so that current will flow through conductor 68. This will operate solenoid 74 and move switch 75 to closed position. The conductors 20 and 22 shown in Fig. 1 will, when the apparatus shown in Fig. 3 is used, be connected to switch 75. Switch 75 will thus act to close the grid circuit of tube 27 and the supply of carbon dioxide to the chamber will be shut off. Should the percentage of carbon dioxide decrease the bridge would again be balanced and current would cease to flow through conductor 68. Solenoid 74 would be deenergized and switch 75 would be moved to open position. The grid circuit of tube 27 would be opened and as above described carbon dioxide would again be supplied to the chamber. The desired percentage of carbon dioxide would thus be accurately maintained.

Referring to Figs. 5 to 9, another form of the invention is shown. In this form the arrangement shown in Fig. 3 is used in the chamber which is supplied with carbon dioxide. The conductors 68 shown in Fig. 3 are shown in Fig. 9 and these conductors are connected to the terminals of a galvanometer 80 having the usual oscillating needle 81, the upper end 81a of which acts as a pointer and cooperates with a scale 82 carried on a casing or housing member 83. Scale 82 is graduated from a central zero point in both directions. The galvanometer 80 is of the usual construction comprising a magnet 80a and the details thereof need not be further described. Needle 81 adjacent its upper end is equipped with a sleeve or bushing 84. This bushing in the movement of needle 81 moves closely adjacent an abutment member 85 illustrated as in the form of a wire which extends in arcuate form adjacent needle 81 and has its ends extending downwardly and bent at right angles, the same being secured in lugs 86a of a frame member 86 of U-shape form surrounding magnet 80a. Said ends of member 85 are engaged and held in place by screws 79. Frame 86 comprises a plate-like portion 86b overlying the magnet 80a and portion 86b has forwardly projecting arms 86c which are connected to and support a cylindrical portion 86d. Portion 86d has a reduced terminal end of cylindrical form which fits into the open end of and abuts a bushing 87 illustrated as secured in the lower part of the housing member 83. Screws 88 extend outwardly from opposite sides of portion 86d and secure thereto a ring 89. Ring 89 is oscillatable about the common axis of screws 88. A member 90 surrounds ring 89 and is movable thereabout and about the axis of said ring and portion 86d. The member 90 at its lower portion is formed as a worm wheel segment 90a. A screw or worm 91 cooperates with the portion 90a meshing therewith and carries a handle portion 91a shown as having a knurled cylindrical end. A thin plate 92 is secured to ring 89 by screws 93 and overlaps a member 90 and portion 86d so that member 90 is held in place on ring 89. It will be noted as shown in Figs. 4 and 7 that portion 86d is cut away at its upper side to form an opening through which needle 81 passes. Member 90 has an upwardly projecting arm 90b to which is secured by rivets 94 a pair of contact springs 95 and 96. Springs 95 and 96 respectively carry contacts 97 and 98 adapted to engage with each other and spring 95 is continued upwardly in an offset portion 95a for a purpose to be later described. Springs 95 and 96 are carried between and separated by insulation plates 99. Member 90 also has rearwardly spaced parallel lugs 90c between which is disposed a roller 102 journaled on a pin 103 secured in lugs 90c. A member 104 is secured to member 90, the same being pivotally connected to member 90 by a screw 104b secured in spaced lugs 90d of member 90 and passing through a lug 104a on member 104. Member 104 extends upwardly and has a top portion 104c of arcuate or segmental form extending in alinement with the arcuate portion of member 85. Another member 105 is provided, the same being of a shape similar to member 104 and having a top arcuate surface extending parallel to the arcuate top portion of member 85 and forming a continuation of the arcuate top portion of member 104. Member 105 is also pivoted at its bottom portion to member 90 by a screw 106 passing through a suitable lug on member 90. A pair of spring or resilient bars 107 and 108 are provided carried by member 90 and at one side thereof so that they are in alinement with member 105. Bars 107 and 108 carry contact members 109 and 110 normally separated but adapted to be brought into engagement as will be later described. Members 104 and 105 are separated a short distance so that there is a space between said members, which space is too narrow for the entrance of sleeve 84.

A small electric motor 116 is mounted upon the frame 86, being carried by a bracket 117 seated on the top of frame 86, said motor being secured by screws 118. Said motor is shown as having terminals 119 to which are connected the usual conductors 120 which will extend to some suitable source of current. The armature shaft of motor 116 is connected to a reducing mechanism such as a worm and worm wheel, the latter being connected by shaft 122 to a disk 123. Disk 123 has depending therefrom a pin 124. Pin 124 is disposed in the plane of a lever arm 125a of a lever 125 oscillatably mounted upon a stud 126 secured in plate 86b and having a nut 127 thereon. Lever 125 has another arm 125b formed as a vertical plate, the outer surface of which is adapted to engage with roller 102 in the movement of lever 125. A tensile coiled spring 127 has one end secured to plate 86b and its other end secured to member 90.

In Fig. 9 a diagram is shown illustrating the circuits and connections used in Figs. 4 to 8 above described. Motor 116 is shown and conductors 120 are illustrated as connected to a suitable source of current such as a battery 130. Galvanometer 80 is shown and conductors 131 and 132 also shown in Fig. 5 extend from the terminals of said galvanometer to conductors 68 within the chamber formed by the wall 133. It will be understood that only a portion of the wall 133 is shown but that said wall will be continuous and enclose a room or closed chamber in which the apparatus shown in Fig. 3 except portions 20, 22, 74 and 75 will be disposed. Needle pointer 81a is shown as is member 85 and sleeve 84. Lever 125 is shown as is a part of member 90 which carries contacts 97 and 98. Members 104 and 105 are shown and members 107 and 108 which carry contacts 109 and 110 are shown. Contact 97 has connected thereto a conductor 135 which extends to a source of current 136. A conductor 137 connects to source of current or battery 136, the same having therein a switch 138 and said conductor 137 extends to one winding 140a of a relay 140, said winding being of rather high resistance. Another conductor 141 extends from the other end of winding 140a to contact 98. Relay 140 has an armature 140c pivoted at 142, said armature having connected thereto a light spring 143 anchored at its other end to a stationary portion 140d of relay 140. Armature 140c carries a contact 140e normally in engagement with a contact 144. A conductor 145 extends from contact 144 to a magnetic or solenoid valve 146 which is contained in and controls a conduit 147. Another conductor 148 extends from valve 146 to a source of current 149 and a conductor 150 extends from source of current 149 to armature 140c, conductor 150 having therein a switch 151. A conductor 152 extends from contact 109 to one end of a winding 140b on relay 140 and a conductor 153 extends from the other end of winding 140b to a source of current 154. A conductor 155 extends from source 154 to contact 110. Conduit 147 extends from valve 146 to a reducing valve 158 and a conduit 147a extends from valve 158 to the discharge valve 159 of a cylinder 160 adapted to contain carbon dioxide under pressure. A pressure gauge 161 is connected to valve 158.

The operation of the device shown in Figs. 4 to 9 is as follows:

Using the bridge shown in Fig. 3 resistance 73 will be adjusted so that the bridge will be balanced with an ordinary atmosphere of air in the chamber within wall 133. No current will then flow through conductors 68 and through galvanometer 80. The discharge valve 159 on the supply tank 160 for carbon dioxide will be opened and reducing valve 161 will be set to give the desired pressure for delivery of carbon dioxide through conduit 147 into the chamber. Switch 138 and switch 151 will be closed and motor 116 will be operated. Contacts 97 and 98 are normally engaged. With said contacts engaged a current will now flow from source of current 136, through contacts 97 and 98, through conductor 141, through winding 140a, through switch 138 and back to source 136. The winding 140a does not exert sufficient magnetic pull or force to move armature 140c against the tension of spring 143. Contacts 140e and 144 thus remain engaged. Contacts 109 and 110 are normally separated so that no current is flowing through winding 140b. With contacts 140e and 144 engaged and switch 151 closed current flows through valve 146 so that this valve is opened and carbon dioxide is thus discharged through conduit 147 into the chamber. With motor 116 running disk 123 is revolved and while the period of rotation could be determined as desired, in practice this disk has made one revolution every minute. At each revolution of disk 123 pin 114 engages lever arm 125a, swinging lever 125 and moving arm 125b against roller 102. This swings member 90 about its pivot 88 and spring arm 95 at its upper portion 95a pushes against member 104 swinging it about its pivot 104b. With an atmosphere of air in the chamber the needle 81 will occupy a normal position so that pointer 81a registers with zero on scale 82. As the proportion of carbon dioxide in the atmosphere increases due to the supplying of the same through conduit 147 the resistance in tube 71 through conductor 72 is varied and needle 81 is moved, the same moving upward as seen in Fig. 5. Sleeve 84 moves along the arcuate portion of member 85. As stated member 90 is swung toward member 85 at each revolution of disk 123 and members 104 and 105 are swung. When member 104 is swung by spring arm 95 it engages sleeve 84 and sleeve 84 engages abutment member 85 so that further movement of member 104 is prevented. The balance of the movement of member 90 must therefore be accommodated by the flexing of arm 95 and this separates contacts 97 and 98. This has no effect on relay 140 and the circuit through valve 146 remains closed and carbon dioxide is thus discharged into the chamber. When needle 81 is sufficiently deflected by the percentage of carbon dioxide in the chamber it moves over so that it will be between member 105 and abutment 85. When member 90 is swung and bushing 84 is not between member 105 and abutment 85, there is no resistance to the swinging movement of member or segment 105 and it can be swung without any change in the relation of contacts 109 and 110 which are normally separated. When sleeve 84, however, by sufficient deflection of needle 81 moves into alinement with member 105 the swinging movement of member 105 will be prevented in part as shown in Fig. 8 and member 105 will push sleeve 84 against member 85. This permits only part of the movement of member 90 and in the balance of the movement spring arm 107 moves toward spring arm 108, engaging contacts 109 and 110. When contacts 109 and 110 are engaged a circuit is closed from source 154 through conductor 155 to contact 110, through contact 109 and conductor 152, through winding 140b and to source 154 through conductor 153. The winding 140b is of rather low resistance and sufficient magnetic pull or force is now exerted by relay 140 to attract armature 140c and separate contacts 140e and 144. When contacts 144 and 140e are separated the circuit through valve 146 is opened and said valve closes, shutting off the supply of carbon dioxide to the chamber within wall 133. After bushing 84 has moved into alinement with segment or member 105, it of course is out of alinement with member or segment 104. It therefore offers no resistance to the movement of member 104 but spring arm 95 and member 104 can move with arm 95 so that said arm will not be flexed and contacts 97 and 98 will not be separated. Said contacts therefore remain engaged and with armature 140c pulled up there is enough magnetic pull in relay 140 to hold said armature pulled up so as to keep contacts 140e and 144 separated. As long as needle 81 is sufficiently deflected to keep sleeve 84 in alinement with member 105 the supply of carbon dioxide will therefore be discontinued. Should the percentage of carbon dioxide, however, decrease in the chamber needle 81 will move back and when it moves sufficiently to come into alinement with member 104 contacts 97 and 98 will be separated in the rotation of disk 123 so that the circuit through winding 140a will be broken. Contacts 109 and 110 will be separated when sleeve 84 moves out of alinement with member 105 and spring 143 will then move armature 140c and reengage contacts 140e and 144. The circuit will again be closed through valve 146 and carbon dioxide will again be supplied to the chamber. As described members 104 and 105 can be adjusted by the turning of screw 91 so that the division point thereof can be located as desired. This, of course, will be located to give the desired percentage of carbon dioxide in the chamber. It will thus be seen that carbon dioxide will be supplied to the chamber until the desired percentage has been reached. When this percentage has been reached the supply will be cut off and will remain cut off until the percentage decreases and more carbon dioxide is needed to maintain the desired percentage. The amount or percentage of carbon dioxide is in effect checked every time the disk 123 makes a revolution. As stated, in the practical use of the apparatus this period was substantially one minute.

Instead of using the bridge illustrated in Fig. 3 in the chamber a bridge such as shown in Fig. 10 could be used. In this structure conductor 170 is connected to one end of the bridge and to a suitable source of current 171. A conductor 172 having an ammeter 173 inserted therein extends from source 171 to a resistance 174. A movable or adjustable contact 175 cooperates with resistance 174 to form a rheostat and a conductor 176 extends from contact 175 to the other end of the bridge. Tubes or cells 177 are disposed on one side of the bridge and tubes or cells 178 are disposed on the other side. The tubes 178 are sealed and will contain air. Tubes 177 have walls of screen material so that the atmosphere of the chamber can pass therethrough. In both cells 177 and 178 a fine wire of platinum or other suitable metal 177a and 178a forms the conductor through the cell. A current will flow through said fine wire and the heat generated in the wire will be conducted away from the wire at a different rate in the tubes 177 than in the tubes 178. This difference will increase as the percentage of carbon dioxide decreases in the chamber. Conductors 180 extend from each side of the bridge at the central portion thereof, one conductor 180 having a movable contact 181 cooperating with a resistance 182. Conductors 180 will be connected to the galvanometer 80 as are the conductors 88 in Fig. 9.

The operation with the bridge shown in Fig. 10 will be the same as already described except that the difference in resistance due to the carbon dioxide in the atmosphere will be augmented as two of the cells or tubes 177 are used. The galvanometer will be deflected in direct ratio to the percentage of carbon dioxide in the atmosphere.

From the above description it is seen that applicant has provided a simple and efficient method and several efficient forms of apparatus for regulating and maintaining an atmosphere in the chamber having a desired percentage of carbon dioxide therein. Such a chamber is now used as a storage chamber for articles of food. The different properties of carbon dioxide and air or some still lighter gas are used in the regulation. The difference in the light transmitting properties of the gases might be utilized by the use of an interferometer. The apparatus used is quite sensitive, yet it is very accurate and the percentage of carbon dioxide can be controlled within very small limits. The articles of food can thus be kept in the storage chamber with assurance that they will be well preserved. An excessive amount of carbon dioxide is injurious to most of the products so that it is quite essential that a dependable regulation must be had so that sufficient carbon dioxide can be maintained in the atmosphere and yet an excessive amount prevented. The form of apparatus disclosed in Figs. 4 to 10 is well suited for use on refrigerator cars. There are no parts the operation of which would be prevented by movement of the cars. The method and apparatus have been demonstrated in actual practice and found to be very successful and efficient.

This application is a continuation in part of application S. N. 135,692, filed by applicant April 8, 1937.

It will, of course, be understood that various changes may be made in the form, details, arrangement and proportions of the apparatus and in the steps and sequence of steps of the method without departing from the scope of applicant's invention, which, generally stated, consists in a method and apparatus capable of carrying out the objects above set forth, such as disclosed and defined in the appended claims.

What is claimed is:

1. A control apparatus for causing a gas to be fed into a chamber containing a second gas having physical properties different from the physical properties of said first mentioned gas and for establishing and maintaining a gaseous content in said chamber consisting of said gases and including a predetermined quantity of said first mentioned gas, comprising a mechanism capable of operation to cause the flow of said first mentioned gas from a source of supply into said chamber until said chamber contains said predetermined quantity of said first mentioned gas, an electrical instrument including a moving member adapted to be actuated to a plurality of different positions in response to alteration of the physical properties of said gaseous content in said chamber as caused by the presence of different quantities of said first mentioned gas, including a position for said moving member corresponding to a gaseous content in said chamber containing said predetermined quantity of said first mentioned gas, an abutment member adjacent which said moving member travels, an adjustable member adjacent and at the opposite side of the path of said moving member, means including a pair of electrical contacts for moving said adjustable member against said moving member to press the same against said abutment member, said contacts being relatively moved by the action of said means whereby when said moving member is in said position and in the path of said adjustable member said contacts will control said mechanism to shut off the supply of said first mentioned gas.

2. A control apparatus for causing a gas to be fed into a chamber containing a second gas having physical properties different from the physical properties of said first mentioned gas and for establishing and maintaining a gaseous content in said chamber consisting of said gases and including a predetermined quantity of said first mentioned gas, comprising a mechanism capable of operation to cause the flow of said first mentioned gas from a source of supply into said chamber until said chamber contains said predetermined quantity of said first mentioned gas, an electrical instrument including a moving member adapted to be actuated to a plurality of different positions in response to alteration of the physical properties of said gaseous content in said chamber as caused by the presence of different quantities of said first mentioned gas, including a position for said moving member corresponding to a gaseous content in said chamber containing said predetermined quantity of said first mentioned gas, an electrical circuit for controlling said valve including an electro-magnet, a movable means adjustable to different positions along the path of travel of said moving member and movable transversely of said path to engage said moving member when aligned therewith, a pair of normally separated contacts carried by said means and relatively moved to be closed when said means engages said moving member to close said circuit, energize said magnet and cause closure of said valve, a motor driven means for moving said means transversely of said path at regular small intervals.

3. A control apparatus for causing a gas to be fed into a chamber containing a different gas and for establishing and maintaining a gaseous content in said chamber consisting of said first mentioned gas and said different gas and including a predetermined quantity of said first mentioned gas comprising a source of supply of said gas, conduit means connecting said source of supply and said chamber, valve means for controlling the flow of said first mentioned gas from said source of supply into said chamber and means for regulating said valve means to cause flow of said first mentioned gas into said chamber until said chamber contains said predetermined quantity of said first mentioned gas and to cause said supply of gas from said chamber to be discontinued when said chamber is made to contain said predetermined quantity of said first mentioned gas, comprising a moving member movable in accordance with the proportion of said first mentioned gas in said chamber, a motor actuated movable member movable across the path of said moving member at regular short intervals, a pair of electrical contacts for controlling said valve relatively moved when said moving member comes into the path of said movable member and is engaged thereby to cause closure of said valve and discontinue the supply of said first mentioned gas.

HERVEY H. BARBER.